United States Patent
Krekelberg

[15] 3,638,697
[45] Feb. 1, 1972

[54] APPARATUS FOR TOPPING ONIONS OR SIMILAR BULBCROPS

[72] Inventor: Gerardus Wilhelmus Marie Krekelberg, Roerzicht 36, Roermond, Netherlands

[22] Filed: Apr. 9, 1969

[21] Appl. No.: 814,750

[30] Foreign Application Priority Data

Apr. 11, 1968 Belgium ................................ 713,522

[52] U.S. Cl. ............................................................ 146/83
[51] Int. Cl. ........................................................ A23n 15/04
[58] Field of Search ................ 146/83, 85, 17.1, 27; 198/220

[56] References Cited

UNITED STATES PATENTS 3,174,520  3/1965  Van Der Vijver ........................ 146/83

FOREIGN PATENTS OR APPLICATIONS 1,042,462  10/1958  Germany .............................. 198/220

Primary Examiner—Willie G. Abercrombie
Attorney—Auslander & Thomas

[57] ABSTRACT

The present invention provides a device for cutting the tailings from onions or other bulblike crops and generally provides for a sieve which is driven by a mechanism so as to impart to the sieve a three-dimensional movement. Preferably, the motor which drives the sieve also serves as the means for driving the cutters.

5 Claims, 5 Drawing Figures

APPARATUS FOR TOPPING ONIONS OR SIMILAR BULBCROPS

The invention relates to a device for cutting the tailings of onions and suchlike bulb crops bearing stems, said device comprising a sieve for conveying and turning the onions and a mechanism for cutting off the protuberances, in this case, the stems of the roots.

Devices of the kind set forth are known.

The existing machines have, however, the disadvantages that apart from too low a production capacity, a high percentage of the onions is not cut because the conveyance across the sieve is too slight due to the movement in only two directions produced by a vibration motor. The rotary movement of the sieve is lacking in that the onions are thrown up too high, often drop one on the other, and do not get all of their protuberances through the sieve. The high elevation, results moreover, in damage of the onions by bruising. Since said known machines require two electric motors for moving the sieve and for rotating the cutters, the construction is comparatively complicated and hence, expensive.

The invention has for its object, to provide a device which obviates the aforesaid disadvantages.

The device in accordance with the invention, is characterized in that the sieve is driven by a mechanism which imparts to said sieve a three-dimensional movement and which in turn is driven by an electric motor, which serves also for driving of the cutters.

It is thus achieved that under the action of the sieve actuated in this manner, the onions are turned and rotated so that every onion, without fail, comes in contact at least once, by its protuberances with the cutter, before it leaves the sieve.

The device in accordance with the invention will be described more fully with reference to the drawing.

Figure 1:
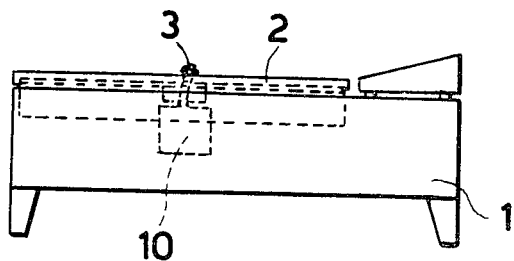
FIG. 1 is a side elevation of the cutting machine on a diminished scale.
Figure 2:
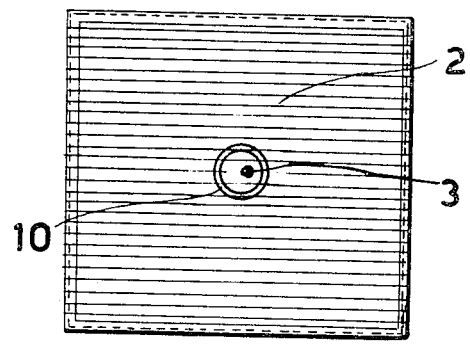
FIG. 2 is a schematic plan view of the tail cutting machines also on a diminished scale.

The machine comprises a frame 1, to which the sieve 2 is suspended, which is connected by means of a bolt 3 at an angle $\alpha$ via the bearing 4 eccentrically with the bearing housing 5. The bearing housing 5 is connected with the aid of the coupling 6, also at an angle $\alpha$ with a cutter holder 7 on which the knives 8 are arranged. The counterpoise 9 is rigidly secured to the bearing housing 5. The cutter holder 7, driven by the electric motor 10, transmits through the coupling 6 the rotary movement at the angle $\alpha$ to the bearing housing 5. Owing to the eccentric connection of the bearing housing 5 with the bearing 4 and the bolt 3 and hence the sieve performs the desired three-dimensional movement. The resultant reactive forces in the sieve 2 are compensated for by the counterpoise 9.

Figure 3:
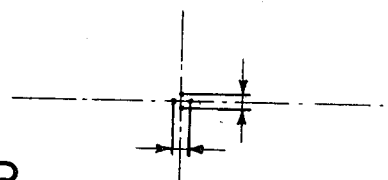
FIGS. 3 and 4 illustrate the resultants of the above movements.
Figure 4:
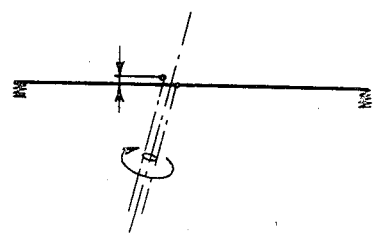
Figure 5:
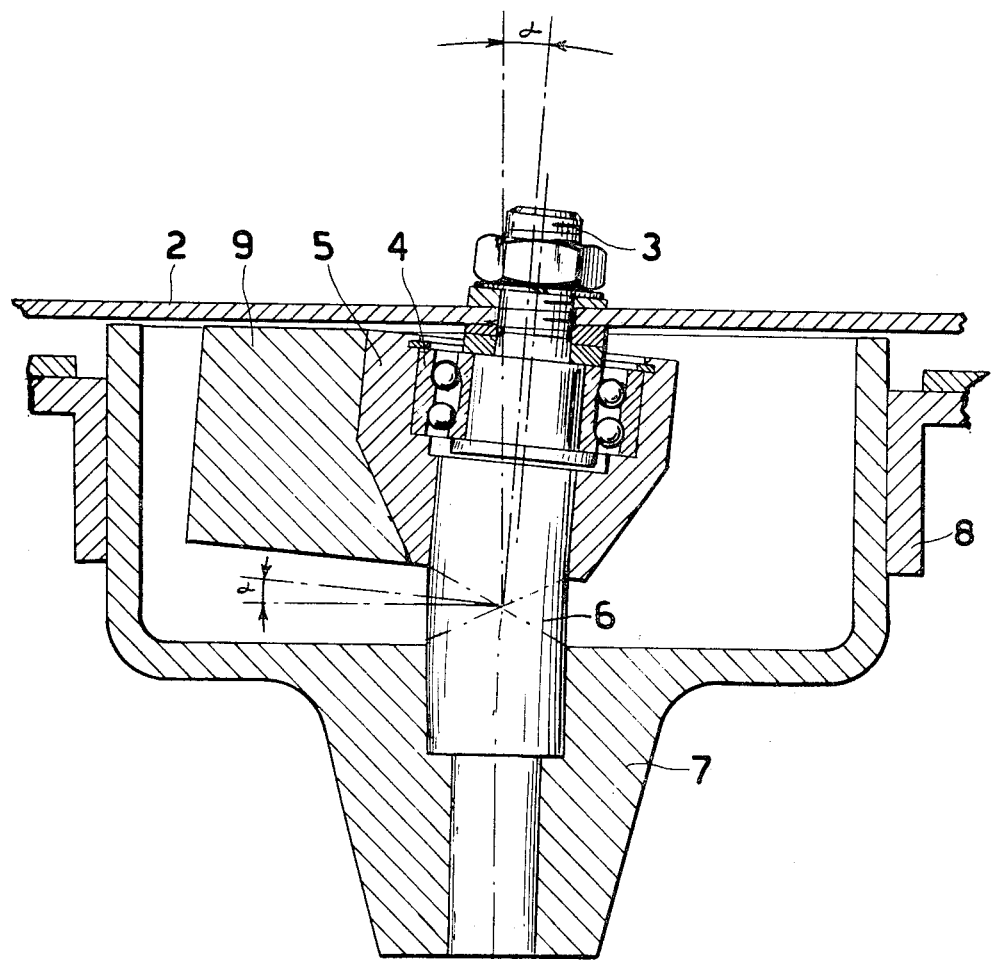
FIG. 5 is an enlarged sectional view of an embodiment of the mechanism from which the sieve derives its movements.

The directions of the resultants of the sieve movements in the horizontal plane are indicated in FIG. 3 and FIG. 4, illustrating the directions of the resultants in the vertical plane. Under the action of the three-dimensional movement of the sieve, the onions perform in all directions, a substantially helical movement so that the protuberances are compelled to pass through openings of the sieve and are simultaneously cut off.

Although such novel feature or features believed to be characteristic of the invention are pointed out in the claims. The invention and the manner in which it may be carried out may be further understood by reference to the description following and the accompanying drawings.

Having thus described certain forms of the invention in some detail, what is claimed is:

1. A device for cutting tailing of onion and other bulb crops bearing protuberances comprising a frame, cutting means within said frame, a sieve in said frame above said cutting means, a single rotation means to impart three-dimensional movement to said sieve, said single rotation movement means rotatably coupled to said sieve at an angle eccentric of the vertical axis of said rotation means and further rotatably coupled eccentric of the vertical of said cutting means, whereby said crops protuberances are cut by said cutting means.

2. The device as claimed in claim 1 wherein said drive means further drives said cutting means.

3. The device as claimed in claim 1 wherein said sieve is mounted to said frame by a bearing angulated eccentrically with respect to the bearing housing for said bearing.

4. The device as claimed in claim 3 wherein said bearing housing includes a counterpoise.

5. The device as claimed in claim 3 wherein said bearing housing is connected at an angle with a cutter holder.

* * * * *